US012693804B2

(12) United States Patent
Bhat et al.

(10) Patent No.: US 12,693,804 B2
(45) Date of Patent: Jul. 28, 2026

(54) BRIDGE DEVICE DATA TRANSFER FOR DATA STORAGE DEVICE ARRAYS

(71) Applicant: Western Digital Technologies, Inc., San Jose, CA (US)

(72) Inventors: Arunakumar Narayan Bhat, Bangalore (IN); Sathiyamoorthy Subramaniam, Bangalore (IN); Swarup Kulkarni, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/750,672

(22) Filed: Jun. 21, 2024

(65) Prior Publication Data

US 2025/0390249 A1     Dec. 25, 2025

(51) Int. Cl.
G06F 3/06 (2006.01)

(52) U.S. Cl.
CPC .......... G06F 3/0659 (2013.01); G06F 3/0604 (2013.01); G06F 3/0656 (2013.01); G06F 3/0679 (2013.01)

(58) Field of Classification Search
CPC .... G06F 3/0659; G06F 3/0604; G06F 3/0656; G06F 3/0679
See application file for complete search history.

(56) References Cited

U.S. PATENT DOCUMENTS

| | | | | |
|---|---|---|---|---|
| 10,075,524 B1 * | 9/2018 | Bshara | ............... | H04L 67/04 |
| 10,409,511 B1 * | 9/2019 | Subbarao | ............. | G06F 3/0607 |
| 10,592,144 B2 | 3/2020 | Roberts | | |
| 10,725,941 B2 | 7/2020 | Subbarao | | |
| 2016/0127492 A1 * | 5/2016 | Malwankar | ......... | H04L 67/1097 |
| | | | | 709/212 |
| 2019/0065382 A1 * | 2/2019 | Velayuthaperumal | ...................... | |
| | | | | G06F 3/065 |
| 2020/0004701 A1 * | 1/2020 | Subbarao | ............ | G06F 11/1068 |
| 2020/0210335 A1 * | 7/2020 | Sundrani | ............ | G06F 12/0246 |
| 2021/0216240 A1 * | 7/2021 | Matsunaga | ........... | G06F 3/0679 |
| 2023/0128954 A1 * | 4/2023 | Benisty | ................ | G06F 3/0673 |
| | | | | 711/154 |

OTHER PUBLICATIONS

International Committee for Information Technology Standards SCSI Extended Copy Command, pp. 1-34, (1999).

* cited by examiner

*Primary Examiner* — Hosain T Alam
*Assistant Examiner* — Subir Kumar Chowdhury
(74) *Attorney, Agent, or Firm* — Patent Law Works LLP

(57) ABSTRACT

Systems, methods, and a bridge device for a data storage device array that enables data transfer between data storage devices without transferring data to the host system are described. The bridge device receives a data transfer command from the host system, such as a fused read and write command, and converts it to separate read and write commands for the source and destination storage devices. The bridge device may operate in a non-volatile memory express over fabric (NVMe-oF) environment and manage the command queues, connection verifications, and command conversions to enable data transfer among storage devices connected to a shared peripheral component interface express (PCIe) root complex without using host network bandwidth or memory.

18 Claims, 8 Drawing Sheets

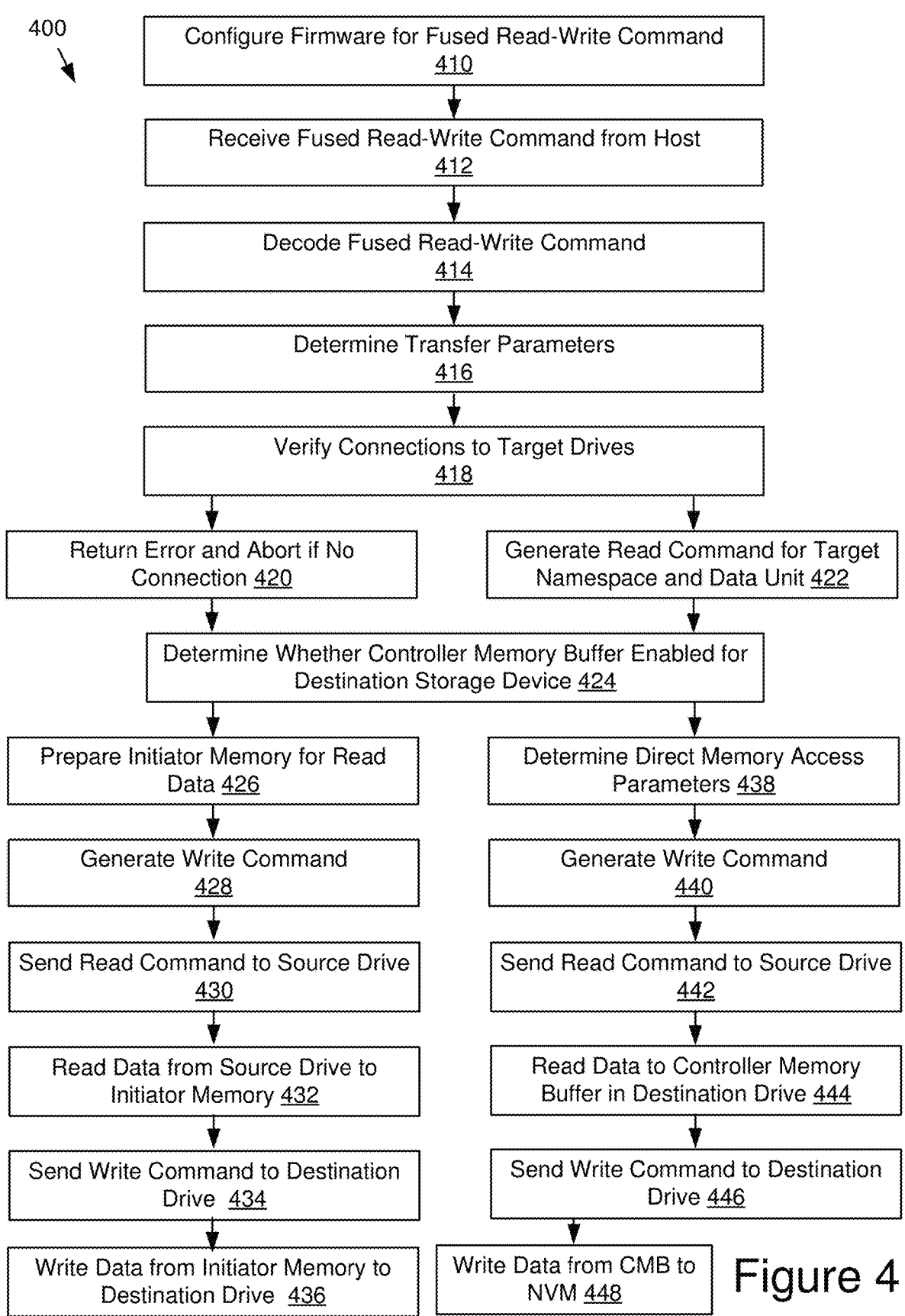

400

Configure Firmware for Fused Read-Write Command
410

Receive Fused Read-Write Command from Host
412

Decode Fused Read-Write Command
414

Determine Transfer Parameters
416

Verify Connections to Target Drives
418

Return Error and Abort if No Connection 420

Generate Read Command for Target Namespace and Data Unit 422

Determine Whether Controller Memory Buffer Enabled for Destination Storage Device 424

Prepare Initiator Memory for Read Data 426

Determine Direct Memory Access Parameters 438

Generate Write Command
428

Generate Write Command
440

Send Read Command to Source Drive
430

Send Read Command to Source Drive
442

Read Data from Source Drive to Initiator Memory 432

Read Data to Controller Memory Buffer in Destination Drive 444

Send Write Command to Destination Drive  434

Send Write Command to Destination Drive 446

Write Data from Initiator Memory to Destination Drive  436

Write Data from CMB to NVM 448

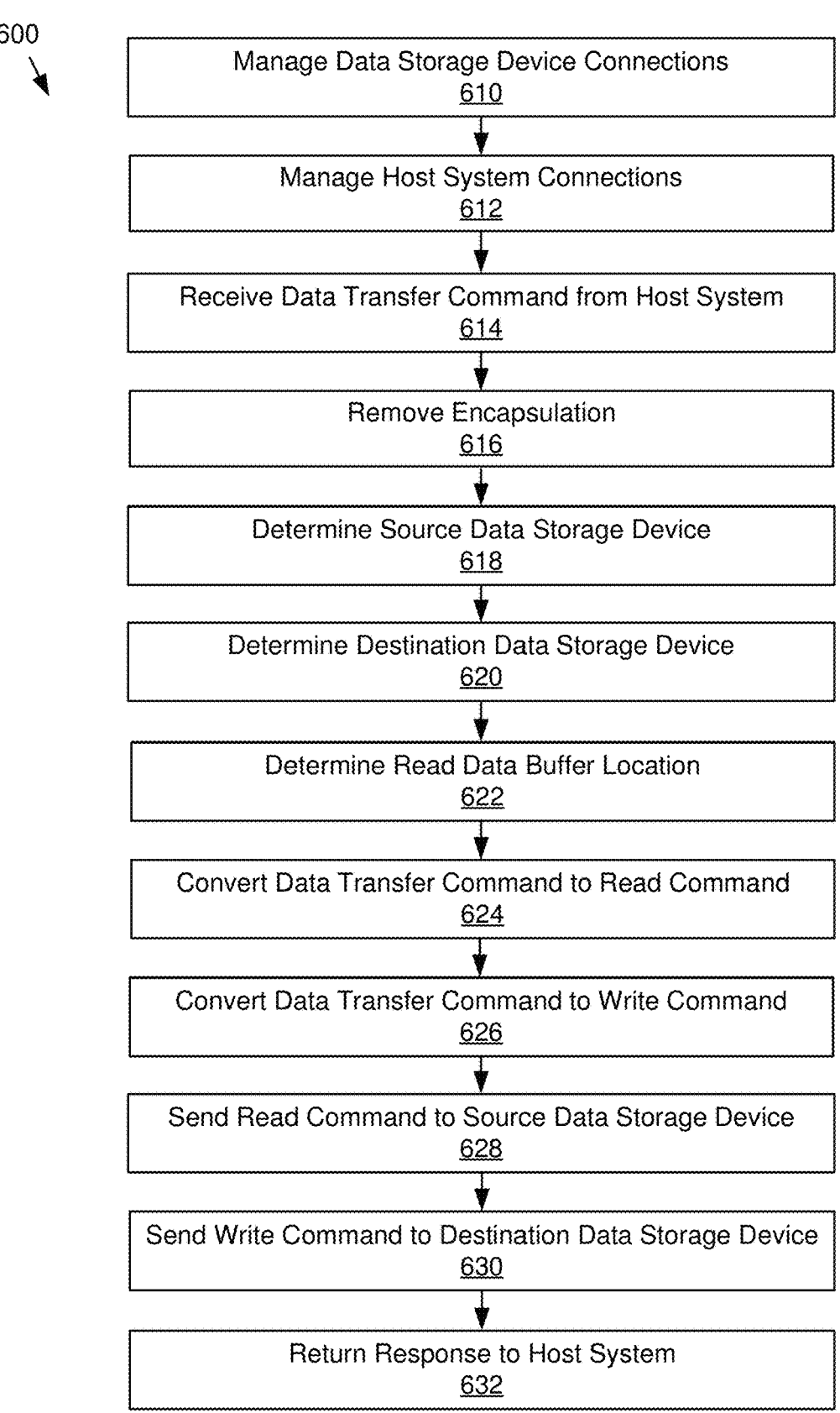

Manage Data Storage Device Connections
610

Manage Host System Connections
612

Receive Data Transfer Command from Host System
614

Remove Encapsulation
616

Determine Source Data Storage Device
618

Determine Destination Data Storage Device
620

Determine Read Data Buffer Location
622

Convert Data Transfer Command to Read Command
624

Convert Data Transfer Command to Write Command
626

Send Read Command to Source Data Storage Device
628

Send Write Command to Destination Data Storage Device
630

Return Response to Host System
632

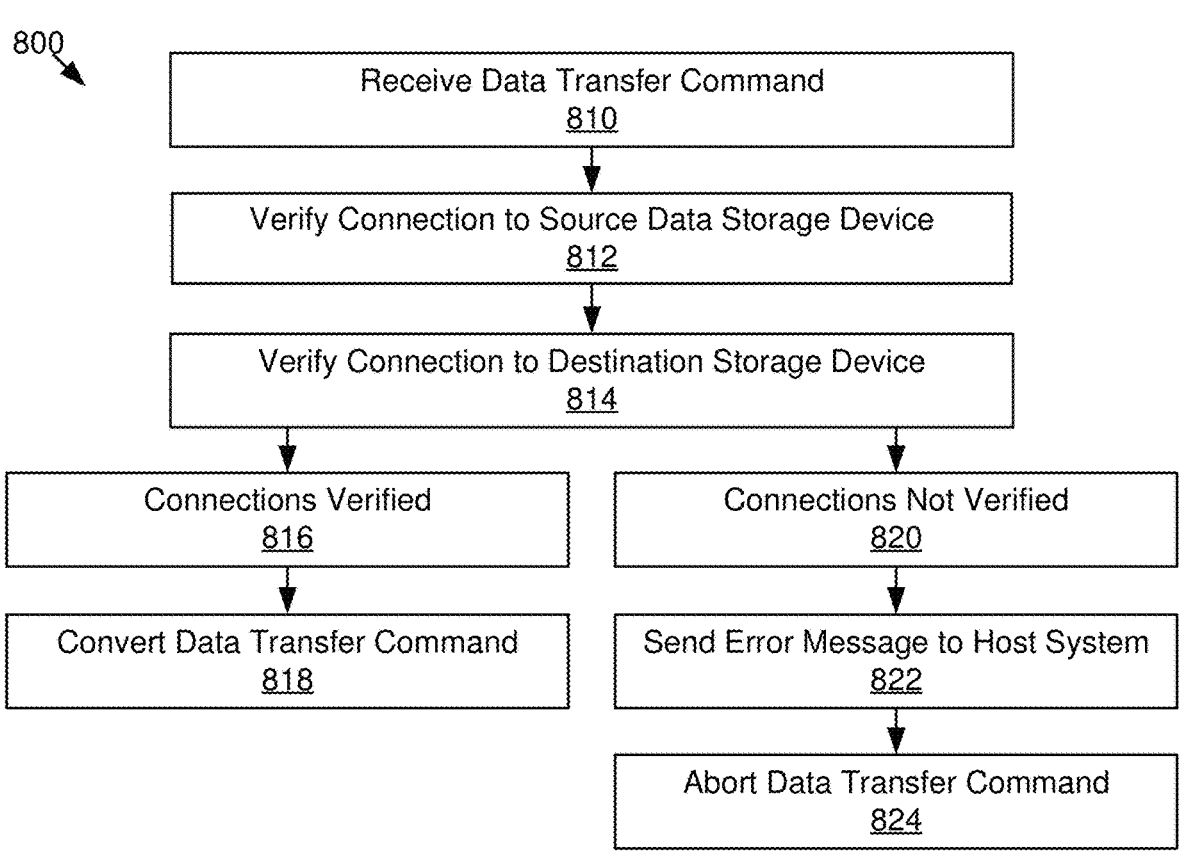

Receive Data Transfer Command
810

Verify Connection to Source Data Storage Device
812

Verify Connection to Destination Storage Device
814

Connections Verified
816

Connections Not Verified
820

Convert Data Transfer Command
818

Send Error Message to Host System
822

Abort Data Transfer Command
824

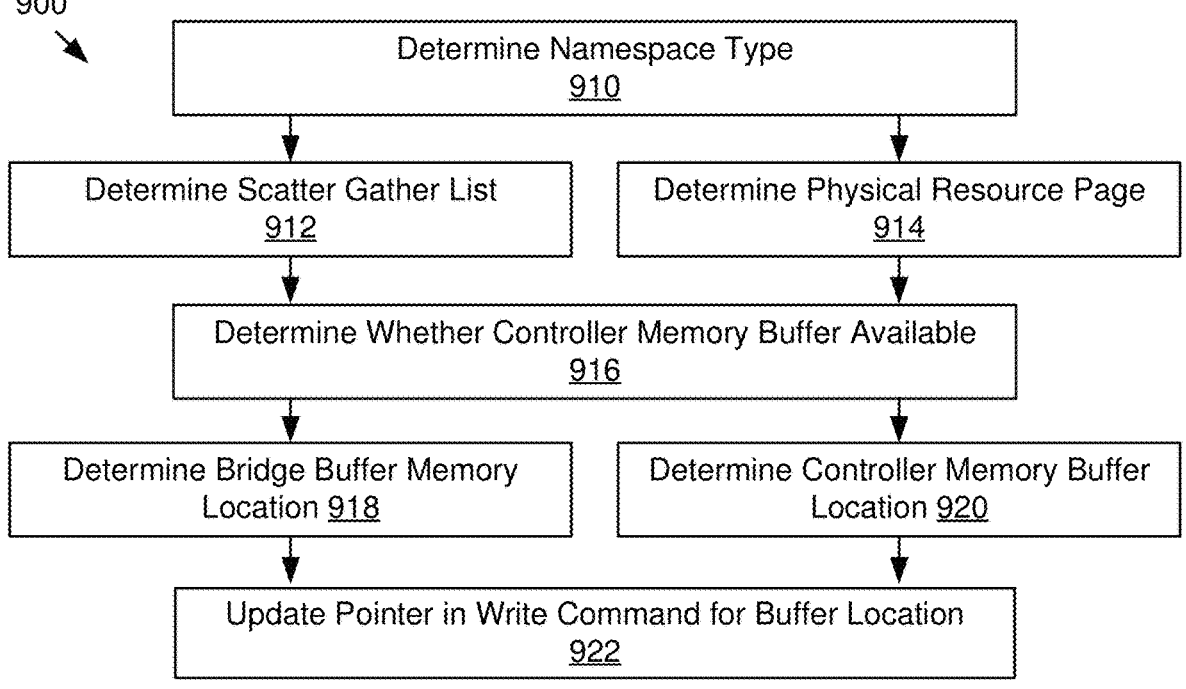

Determine Namespace Type
910

Determine Scatter Gather List
912

Determine Physical Resource Page
914

Determine Whether Controller Memory Buffer Available
916

Determine Bridge Buffer Memory Location 918

Determine Controller Memory Buffer Location 920

Update Pointer in Write Command for Buffer Location
922

Figure 9

BRIDGE DEVICE DATA TRANSFER FOR DATA STORAGE DEVICE ARRAYS

TECHNICAL FIELD

The present disclosure generally relates to storage systems using bridge devices for connecting host systems to an array of data storage devices and, more particularly, to a non-volatile memory express bridge device that enables data transfer between connected data storage devices without transferring data to the host system.

BACKGROUND

In the realm of data storage, the use of Non-Volatile Memory Express over Fabrics (NVMe-oF) has become increasingly prevalent. This protocol allows for the efficient transfer of data over a network between a host system and a storage system. One implementation of this technology involves the use of an Application-Specific Integrated Circuit (ASIC) device that acts as a bridge device between the host and the storage system. This bridge device can operate in two modes: as a target, receiving commands from the host and transmitting responses and data from the data storage devices back to the host, or as an initiator, sending commands received from the host to the data storage devices and receiving their response for the host.

However, current implementations of this technology have limitations, particularly when it comes to transferring data between two storage devices connected to the same bridge device. In such scenarios, the data is first transferred to the host system before being sent to the destination storage device. This process can be inefficient and can create a bottleneck, particularly in high-throughput data transfer scenarios. Therefore, there is a clear demand for improvements in this area to enhance the efficiency and performance of data transfer operations in storage systems.

Therefore, there still exists a need for a system that enables direct data transfer between storage devices connected to the same bridge device without involving the host system, thereby enhancing the efficiency and performance of data transfer operations in storage systems.

SUMMARY

Various aspects for bridge device data transfer in data storage device arrays are described. More particularly, a bridge device receiving a fused read/write data transfer command and converting it into separate read and write commands that use a buffer memory not located in the host system is described.

One general aspect includes a system that includes: a storage interface configured to communicate with a plurality of data storage devices; a host interface configured to communicate with at least one host system; and a bridge device. The bridge device may include at least one controller configured to, alone or in combination: receive, from the at least one host system, at least one data transfer command identifying a target data unit, a source data storage device, and a destination data storage device, where the plurality of data storage devices includes the source data storage device and the destination data storage device; convert the at least one data transfer command into at least a write command to the destination data storage device for the target data unit, where the destination data storage device reads the target data unit for the write command from one of a bridge device memory and a controller memory buffer of the destination data storage device; and write the target data unit to a non-volatile storage medium of the destination data storage device.

Implementations may include one or more of the following features. The at least one data transfer command may include a fused command that includes parameters for a modified read command for the source data storage device and a modified write command for the destination data storage device. The at least one controller is further configured to, alone or in combination: manage storage interface connections with the plurality of data storage devices using a shared interface root complex; verify, responsive to receiving the at least one data transfer command, a first connection to the source data storage device and a second connection to the destination data storage device; and send, responsive to verification being unsuccessful, an error message to the at least one host system. The at least one data transfer command may be received from the at least one host system using a network storage protocol that encapsulates the at least one data transfer command; converting the at least one data transfer command may include removing encapsulation of the at least on data transfer command prior to generating the write command; and the at least one controller may be further configured to, alone or in combination, send the write command to the destination data storage device using a bus storage protocol. Converting the at least one data transfer command may include: generating a read command for the target data unit indicating a buffer location for read data; and generating the write command for the target data unit indicating the buffer location for the read data. The buffer location may not be in the at least one host system and the at least one controller may be further configured to, alone or in combination: determine the buffer location for the at least one data transfer command; send the read command to the source data storage device; and send the write command to the destination data storage device. Determining the buffer location may include at least one of: determining at least one scatter gather list for the buffer location; and determining at least one physical region page for the buffer location. Receiving the at least one data transfer command may use a first set of command queues in the bridge device configured for host commands; and sending the read command and the write command may use a second set of command queues in the bridge device configured for data storage device commands. The destination data storage device may include the controller memory buffer and provide, for the source data storage device, direct memory access to the controller memory buffer through a shared interface root complex. The target data unit may not be stored in the bridge device memory between reading the target data unit from the source data storage device and writing the target data unit to the non-volatile storage medium of the destination data storage device. The system may include: a switch configured to provide a bus connection between the bridge device and the plurality of data storage devices; and the plurality of data storage devices. Each data storage device of the plurality of data storage devices may include: a non-volatile storage medium configured to store host data units; a device storage interface configured for communication with the bridge device; and a device controller configured to receive storage commands using a bus storage protocol.

Another general aspect includes a computer-implemented method that includes receiving, by a bridge device and from at least one host system, at least one data transfer command identifying a target data unit, a source data storage device, and a destination data storage device, where: the bridge device includes a host interface configured for communication with the at least one host system and a storage interface configured for communication with a plurality of data storage devices; and the plurality of data storage devices includes the source data storage device and the destination data storage device. The method also includes: converting, by the bridge device, the at least one data transfer command into at least a write command to the destination data storage device for the target data unit, where the destination data storage device reads the target data unit for the write command from one of a bridge device memory and a controller memory buffer of the destination data storage device; and writing, responsive to the write command, the target data unit to a non-volatile storage medium of the destination data storage device.

Implementations may include one or more of the following features. The at least one data transfer command may include a fused command that includes parameters for a modified read command for the source data storage device and a modified write command for the destination data storage device. The computer-implemented method may include: managing, by the bridge device, storage interface connections with the plurality of data storage devices using a shared interface root complex; verifying, by the bridge device and responsive to receiving the at least one data transfer command, a first connection to the source data storage device and a second connection to the destination data storage device; and sending, by the bridge device and responsive to verification being unsuccessful, an error message to the at least one host system. The computer-implemented method may include sending, by the bridge device, the write command to the destination data storage device using a bus storage protocol, where: the at least one data transfer command is received from the at least one host system using a network storage protocol that encapsulates the at least one data transfer command; and converting the at least one data transfer command comprises removing encapsulation of the at least on data transfer command prior to generating the write command. The computer-implemented method may include: determining, by the bridge device, a buffer location for the at least one data transfer command, where the buffer location is not in the at least one host system, and converting the at least one data transfer command may include generating a read command for the target data unit indicating the buffer location for read data and generating the write command for the target data unit indicating the buffer location for the read data; sending, by the bridge device, the read command to the source data storage device; and sending, by the bridge device, the write command to the destination data storage device. Determining the buffer location may include at least one of: determining at least one scatter gather list for the buffer location; and determining at least one physical region page for the buffer location. Receiving the at least one data transfer command may use a first set of command queues in the bridge device configured for host commands; and sending the read command and the write command may use a second set of command queues in the bridge device configured for data storage device commands. The computer-implemented method may include providing, for the source data storage device, direct memory access to the controller memory buffer in the destination data storage device through a shared interface root complex. The target data unit may not be stored in the bridge device memory between reading the target data unit from the source data storage device and writing the target data unit to the non-volatile storage medium of the destination data storage device.

Still another general aspect includes a bridge device that includes: a storage interface configured to communicate with a plurality of data storage devices; a host interface configured to communicate with at least one host system; means for receiving, from at least one host system, at least one data transfer command identifying a target data unit, a source data storage device, and a destination data storage device, where the plurality of data storage devices includes the source data storage device and the destination data storage device; means for converting the at least one data transfer command into at least a write command to the destination data storage device for the target data unit, where the destination data storage device reads the target data unit for the write command from one of: a bridge device memory; and a controller memory buffer of the destination data storage device. The device also includes means for writing, responsive to the write command, the target data unit to the destination data storage device.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve data transfer between data storage devices connected to the same bridge device, such as by using fused read/write data transfer commands that are handled by the bridge device without using host buffer memory. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

FIG. 4 is a flowchart of an example method of handling a fused read-write command in a storage system.

FIG. 6 is a flowchart of an example method of managing data transfer commands in a bridge device.

FIG. 8 is a flowchart of an example method of verifying connections for a data transfer command.

FIG. 9 is a flowchart of an example method of determining a read data buffer location for executing a data transfer command.

DETAILED DESCRIPTION

Figure 1:
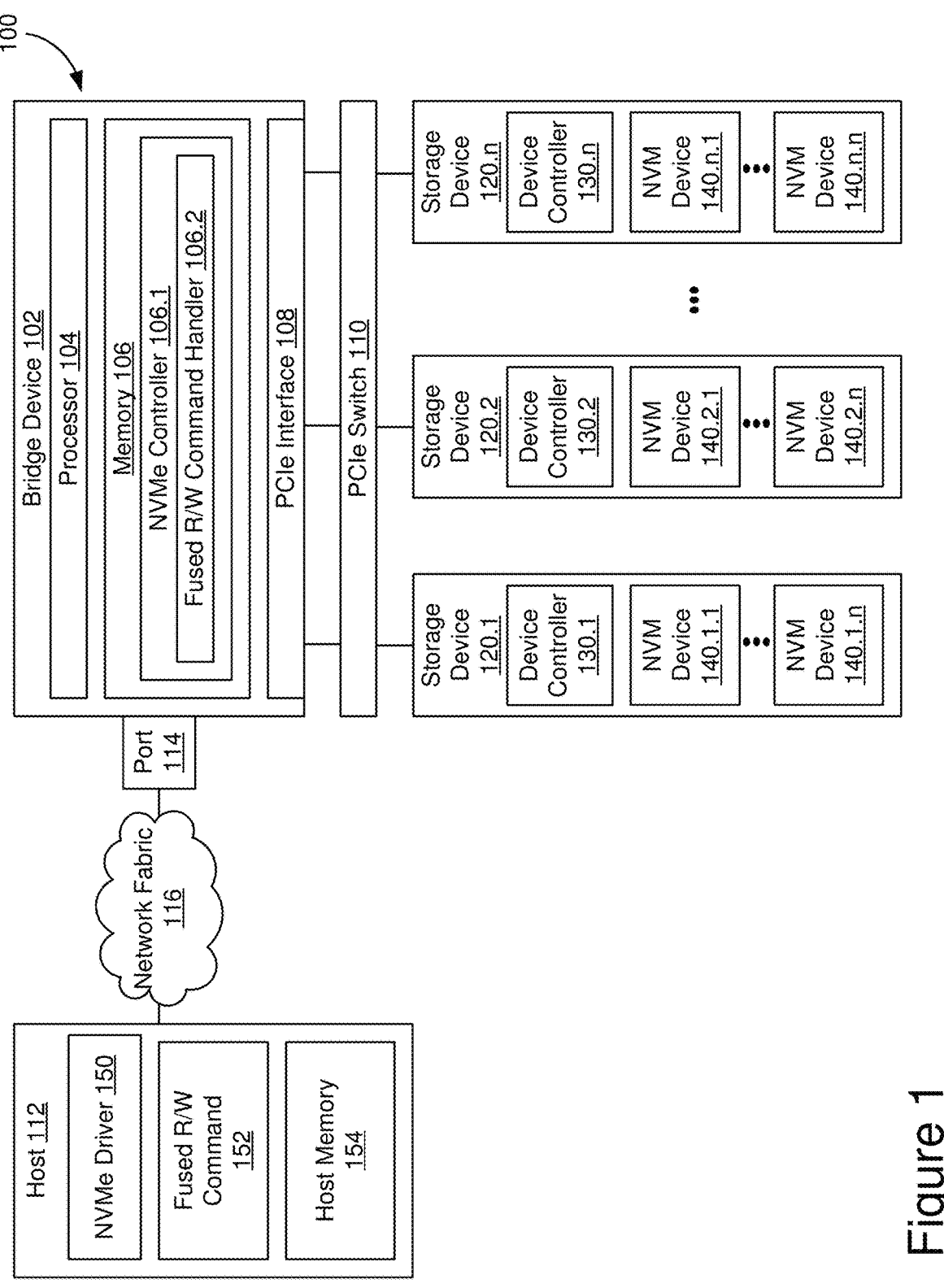
FIG. 1 schematically illustrates a multi-device storage system supporting at least one host system through a bridge device configured for data transfer between data storage devices.

FIG. 1 shows an embodiment of an example data storage system 100 with multiple data storage devices 120 supporting at least one host system 112 through a bridge device 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with bridge device 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers, and/or other intermediate components between storage devices 120 and host systems 112. For example, each bridge device 102 may provide a storage interface connection for a corresponding set of storage devices 120 in a storage node and their respective storage devices may be connected through a corresponding backplane network and/or internal bus architecture that provides multiple backend paths, which may include a path through switch peripheral component interconnect express (PCIe) switch 110. In some embodiments, at least some storage controller functions may be included within bridge device 102 for connecting storage devices 120 through a fabric network for communication with host system 112. For example, bridge device 102 may be an application specific integrated circuit (ASIC) configured to act as a target for non-volatile memory express over fabric (NVMe-oF) protocols from the host and an initiator for non-volatile memory express (NVMe) protocols to storage devices 120.

In the embodiment shown, a number of storage devices 120 are attached to a common storage interface bus for host communication through switch 110 and bridge device 102. For example, storage devices 120 may be drives including physical interface ports supporting PCIe and/or other bus or network physical, transport, and application protocols. In some configurations, bridge device 102 provides a storage interface initiator function for NVMe connections to storage devise 120 through PCIe interface 108. The NVMe connection may use switches 110 to route data traffic from PCIe interface 108 to corresponding PCIe interface ports on storage devices 120. For example, PCIe interface 108 may connect bridge device 102 through PCIe switch 110 to each PCIe interface port of storage devices 120.1-120.n. The plurality of physical storage device port connections on each storage device 120 may define physical, transport, and other logical channels for establishing communication with the different components and subcomponents for establishing a communication channel to host 112 through bridge device 102.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with PCIe interface 108 through PCIe switch 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some configurations, multiple processors or processor cores and/or multiple device controller circuits may operate alone or in cooperation to provide the functions of each storage device 120. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s). In some configurations, storage devices 120 may be configured for direct memory access (DMA), such as using remote direct memory access (RDMA) protocols through PCIe switch 110, PCIe interface 108, and a corresponding shared PCIe root complex. For example, storage devices 120 may include controller memory buffers controlled by device controllers 130 to provide buffer memory accessible using DMA protocols from other devices in storage system 100, such as other storage devices 120, bridge device 102, and/or host 112.

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, namespaces containing multiple host data units, or other logical data constructs composed of multiple host blocks.

In some embodiments, bridge device 102 may be coupled to host 112 through at least one network interface that is part of a host fabric network 116 and includes bridge device 102 as a host fabric interface. In some embodiments, host system 112 may be coupled to data storage system 100 through fabric network 116 and bridge device 102 may be capable of supporting communications with multiple host systems 112. Fabric network 116 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, switch 110 and/or bridge device 102 may be referred to as a host interface bus and provides a host data path between storage devices 120 and host system 112, through bridge 102.

Host system 112 may be any suitable computer device, such as a computer, a computer server, a laptop computer, a tablet device, a netbook, an internet kiosk, a personal digital assistant, a mobile phone, a smart phone, a gaming device, or any other computing device. Host system 112 is sometimes called a host, host device, host node, client, or client system. In some embodiments, host system 112 is a server system, such as a server system in a data center. In some embodiments, host system 112 is physically distinct from a storage node housing the plurality of storage devices 120 and/or bridge device 102. In some embodiments, host system 112 may be one of a plurality of host systems owned, operated, and/or hosting applications belonging to a plurality of entities and supporting one or more quality of service (QoS) standards for those entities and their applications. Host system 112 may be configured to store and access data in the plurality of storage devices 120 in a multi-tenant configuration with shared storage resource pools. For example, host queue pairs (comprised of paired submission queues and completion queues) may be dynamically mapped to backend queue pairs using logical host connections to enable access to namespaces allocated in NVM devices 140 of storage devices 120. In some configurations, host system 112 may include at least one administrative queue pair configured for host communication regarding storage device management and configuration and a number of storage queue pairs for dynamic host connections to storage devices 120 and the namespaces they contain.

In some configurations, host system 112 may include an NVMe driver 150 configured to provide storage communications for storage devices 120 through bridge device 102. For example, NVMe driver 150 may implement NVMe storage protocols for generating host storage commands (both administrative commands and storage input/output (I/O) commands) for accessing namespaces in storage devices 120. NVMe driver 150 may include or interface with an NVMe-oF driver (sometime referred to as an NVMe fabric driver) configured to encapsulate NVMe commands for transport through network fabric 116. Host system 112 may include a fused read/write (R/W) data transfer command 152 for initiating data transfers between storage devices 120 without using host memory 154 as a buffer memory location. For example, NVMe driver 150 may support a vendor unique command that include read command parameters and write command parameters for a data transfer operation. In some configurations, fused R/W data transfer command 152 may not include a buffer location for the return of the read portion of the command or buffer location for the source of the write portion of the command and bridge device 102 may be configured to manage the buffer locations without using data transfer through network fabric 116 or storage in host memory 154 to complete the transfer. Host memory 154 may include host memory pages configured in a buffer memory to receive read data returned from host read operations to storage devices 120 and/or write data buffered for host write operations to storage devices 120. For example, host memory 154 may include some or all of a volatile memory device in host 112 configured to buffer data for data storage operations.

Bridge device 102 may include one or more central processing units (CPUs) or processors 104 for executing compute operations, storage management operations, and/or instructions for accessing storage devices 120 through switch 110. In some configurations, multiple processors or processor cores and/or multiple controller circuits may operate alone or in cooperation to provide the functions of bridge device 102. For example, bridge device 102 may instantiate a storage interface controller, such as at least one NVMe controller 106.1, to provide a connection path from host 112 to storage devices 120. In some configurations, NVMe controller 106.1 may instantiate multiple NVMe controllers and/or corresponding drivers and processors, such as an NVMe-oF controller to act as a target for host 112 and an NVMe controller to act as initiator for storage devise 120. In some configurations, host port 114 may be configured as a network port for network connection to host 112 over fabric network 116. In some embodiments, processors 104 may include a plurality of processor cores which may be assigned or allocated to parallel processing tasks and/or processing threads for different storage operations and/or host storage connections. In some embodiments, processor 104 may be configured to execute NVMe controller 106.1 for managing communication between host 112 and storage devices 120.

Bridge device 102 may include a memory 106 configured to support the processing functions of processor 104. For example, memory 106 may instantiate NVMe controller 106.1 for managing host storage connections allocated between host system 112 and storage devices 120 for accessing namespaces defined in those storage devices. In some configurations, NVMe controller 106.1 may be configured with a fused R/W command handler 106.2 to convert fused R/W data transfer commands 152 from host 112 into corresponding read and write commands to target storage devices 120 for data transfer. For example, fused R/W data transfer command handler 106.2 may receive and parse a fused R/W data transfer command from host 112 received via NVM-oF protocols as an atomic host operation to generate separate NVMe read and write commands to source and destination storage devices selected among storage devices 120. In some embodiments, memory 106 may include one or more dynamic random access memory (DRAM) devices for use by storage devices 120 for command, management parameter, and/or host data storage and transfer.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
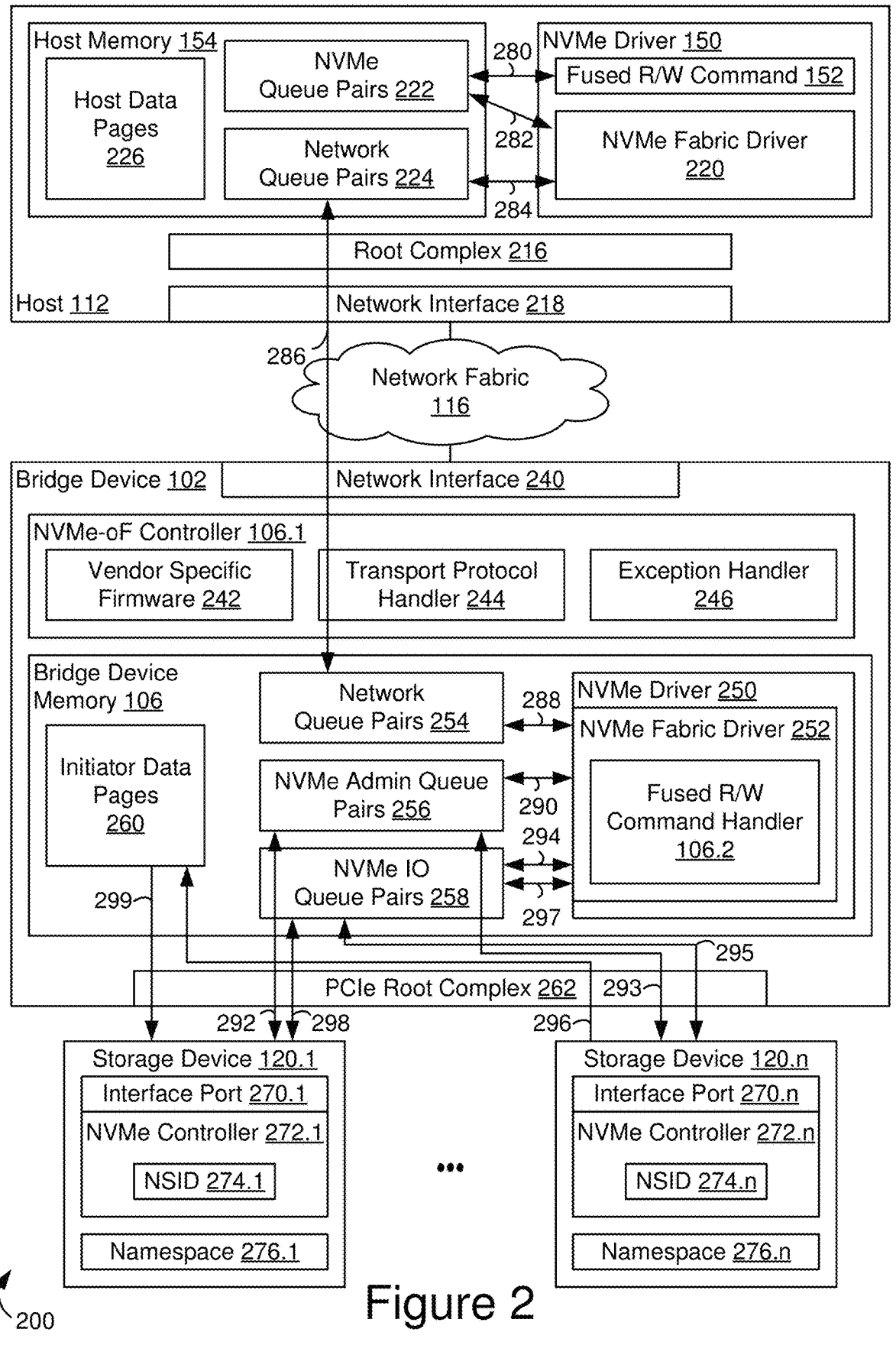
FIG. 2 schematically illustrates a system architecture using a bridge device for data transfer, such as the bridge device of FIG. 1.

FIG. 2 shows a system architecture in a storage system 200 using data transfer commands to a bridge device to execute data transfers between storage devices without the data returning to the host, such as storage system 100 of FIG. 1. Host 112 (including NVMe driver 150, fused R/W command 152, and host memory 154), network fabric 116, bridge device 102 (including NVMe-oF controller 106.1 and fused R/W command handler 106.2), and storage devices 120.1-120._n_ may be configured and operate substantially as described above for FIG. 1.

Host 112 may be equipped with NVMe driver 150, which is configured to generate a fused read/write data transfer command. This command may include both read and write parameters that are combined into a single operation, streamlining the process of data transfer between storage devices. NVMe driver 150 may also be responsible for interfacing with the host's operating system to receive and process I/O requests that are then translated into NVMe commands. Host 112 may include a network interface 218, such as one or more ethernet ports, supporting network connections using ethernet, internet protocols, and/or other network protocols for communication through fabric network 116. Host 112 may include a root complex 216 providing bus communications and interfaces among NVMe driver 150, host memory 154, network interface 218, and other host system components, such as one or more host processors, subsystem controllers, and/or peripheral components.

Host memory 154 may serve as a temporary storage area for data that is being read from or written to the storage devices, and it may also store NVMe driver 150 and related software components that facilitate the data transfer process.

In some configurations, host memory 154 may allocate memory space to and instantiate two different sets of queue pairs. A first set of NVMe queue pairs 222, including submission queues and completion queues, may be configured to receive the NVMe storage commands, including fused R/W data transfer commands 152, in accordance with NVMe storage command protocols. The second set of network queue pairs 224, including submission queues and response queues, may be configured to receive NVMe-oF storage commands that have been encapsulated for network transport, including encapsulated fused R/W data transfer commands, in accordance with NVMe-oF storage command protocols. Host memory 154 may include host data pages 226 configured to provide buffer memory for storage operations to and from storage devices 120 (though bridge device 102). For example, host memory 154 may include a set of buffer storage locations allocated in one or more volatile memory devices and configured to map hist data units and/or corresponding NVM page or erase block sizes for transferring write data through network fabric 116 to storage devices 120 and receiving read data through network fabric 116 from storage devices 120. Host data pages 226 and/or data transfer through network interface 218 and network fabric 116 may be bandwidth constraints to the I/O processing and data storage performance of storage system 200 and enabling data transfer between storage devices 120 without transferring data to host data pages 226 through network fabric 116 and network interface 218 may improve the quality of service of the system.

The NVMe fabric driver 220, which may reside within host 112, may be configured to encapsulate the fused read/write data transfer command generated by NVMe driver 150. This encapsulation may be performed using a network storage protocol, such as NVMe-oF, that allows the command to be transmitted over a network fabric to bridge device 102. The NVMe fabric driver 220 may also handle the de-encapsulation of incoming storage command responses received from the network, preparing them for processing by NVMe driver 150.

Bridge device 102 may be configured to receive a fused read/write data transfer command from host 112 and convert it into separate read and write commands directed to storage devices 120. Bridge device 102 may include a network interface 240 configured to receive storage commands from host 112 over fabric network 116. For example, network interface 240 may include a network port, such as ethernet port, and corresponding ethernet, internet, and/or other network protocols.

NVMe-oF controller 106.1 within bridge device 102 may include hardware and software for receiving commands from host 112 and providing corresponding commands to storage devices 120. This controller may instantiate processing hardware and communication protocols that ensure that the commands conform to the NVMe over Fabrics standards for efficient data handling. For example, NVMe-oF controller 106.1 may implement a hardware and firmware stack for implementing NVMe-oF to NVMe conversion protocols for supporting storage operations between host 112 using NVMe-oF protocols over network communications and storage devices 120 using NVMe protocols over storage bus communications. In some configurations, NVMe-oF controller 106.1 may include or interface with one or more bridge device processors, such as processor 104 in FIG. 1, to execute firmware instructions loaded into operating bridge device memory 106 and/or incorporate specialized processing circuits for specific functions. In some configurations, vendor specific firmware 242 may include a firmware package configured to modify the basic protocols of NVMe and NVMe-oF to support vendor-specific configurations, such as a fused R/W data transfer command. Transport protocol handler 244 may include hardware and/or software components configured to manage network transport protocols to support communication with host 112 using NVMe-oF standard compliant protocols. Exception handler 246 may include logic for interfacing between standard NVMe and NVMe-oF firmware and vendor specific configurations in vendor specific firmware 242. In some configurations, NVMe-oF controller 106.1 may instantiate one or more components of NVMe driver 250 and/or NVMe fabric driver 252 in bridge device memory 106 for execution during runtime.

Bridge device memory 106 may include operating memory and buffer memory for executing NVMe-oF and NVMe compliant storage command handling and conversion between target and initiator roles. It may also assist in queuing the commands for execution by the storage devices and response to the hosts. NVMe driver 250 may include an initiator configuration for sending storage commands to storage devices through PCIe root complex 262 using NVMe protocols. NVMe driver 250 may include or interface with NVMe fabric driver 252 for receiving storage commands according to NVMe-oF protocols in first set of command queues, such as network queue pairs 254, and convert them to NVMe storage commands in a second set of command queues mapped to storage devices 120, such as NVMe I/O queue pairs 258. Network queue pairs 254 may include submission queues and response queues for communication with host 112 and corresponding network queue pairs 224. NVMe I/O queue pairs 258 may include submission queues and completion queues for communication with storage devices 120. In the configuration shown, the NVMe queue pairs are shown to include both NVMe admin queue pairs 256 and NVMe I/O queue pairs 258, NVMe admin queue pairs 256 may include one or more queue pairs allocated to administrative commands, such as status queries and interrupts between storage devices 120 and bridge device 102. Note that network queue pairs 254 and 224 and NVMe queue pair 222 may also support admin queue pairs, but these are not shown separately. NVMe I/O queue pairs 256 may include storage command submission and completion queues dynamically allocated to namespaces to read, write, delete, and similar operations targeting host data units in those namespaces. In some configurations, NVMe fabric driver 252 may include or interface with vendor specific firmware for fused R/W data transfer command handler 106.2.

In some configurations, bridge device memory 106 may include initiator data pages 260 configured in buffer memory for supporting data transfers between data storage devices. For example, in configurations that do not include or do not use controller memory buffers in storage devices 120, read data for data transfers may be staged in initiator data pages 260 for subsequent write operations to the destination storage device. Initiator data pages 260 may include buffer storage locations corresponding to host data units and/or NVM data pages or erase block sizes that are addressable for supporting the data transfers. For example, host data from the source data storage device may be read into storage locations (pages) in initiator data pages 260 and then be written from those pages in to the destination data storage device.

In some configurations, bridge device 102 may include a PCIe interface, such as PCIe interface 108, and interface with a PCIe switch, such as PCIe switch 110, and corresponding PCIe interfaces in storage devices 120 to establish a shared PCIe root complex 262. For example, bridge device 102 and data storage devices 120.1-120.n may be interconnected through a common storage bus interface that enables bus communication according to PCIe bus interface standards for communication among any devices connected to that bus. This shared bus interface root complex may enable storage devices 120 to directly communicate with one another, as well as with bridge device 102, to enable direct memory access for efficient transfer of host data between any two devices.

Storage devices 120.1-120.n may each include a corresponding interface port 270.1-270.n configured for storage interface bus communication through PCIe root complex 262. For example, each interface port 270.1-270.n may be configured as a PCIe port compliant with physical and transport standards for PCIe compliant communication. Storage devices 120.1-120.n may each include corresponding NVMe controllers 272.1-272.n configure the storage devices as NVMe targets for NVMe storage commands. For example, NVMe controllers 272.1-272.n may support host connections with or through bridge device 102 for corresponding sets of namespaces 276.1-276.n allocated on those storage devices for storing host data. NVMe controllers 272 may use namespace identifiers 274 to designate and manage storage commands to those respective namespaces. For example, unique namespace identifiers 274 may be assigned to each namespace allocated in one or more storage devices and discoverable by host 112 for storing host data and host connections may be initiated to specific namespaces according to their namespace identifier.

In some configurations, data transfer commands initiated by host 112 may generate a series of data flows 280-299 for the execution of those commands. For example, NVMe driver 150 may receive host instructions from the host operating system for the transfer of one or more host data units between namespaces in different data storage devices. At data flow 280, NVMe driver 150 may use fused R/W data transfer command 152 to generate a command and add it to a submission queue in NVMe queue pairs 222 for a host connection to storage devices 120. For example, NVMe driver 150 may include logic for receiving parameters for the target data unit and data transfer and generate modified read and write commands that are fused into an atomic vendor-specific command supported by the target bridge device. At data flow 282, NVMe fabric driver 220 may select the command from the submission queue in NVMe queue pairs 222 and encapsulate it for transmission through network fabric 116. At data flow 284, NVMe fabric driver 220 may add the encapsulated data transfer command to a submission queue in network queue pairs 224. At data flow 286, the encapsulated data transfer command may be directed through network fabric 116 between host 112 as initiator and bridge device 102 as target. The encapsulated data transfer command may be received in a corresponding submission queue in network queue pairs 254.

At data flow 288, NVMe fabric driver 252 may select the encapsulated data transfer command from network queue pairs 254 for processing, remove the encapsulation, and recognize it as a vendor-specific data transfer command. Fused R/W command handler 106.2 may parse the data transfer command to determine the source and destination storage devices. At data flow 290, status commands may generated and added to submission queues in NVMe admin queue pairs 256 for verifying connection to the source and destination storage devices. At data flow 292, the destination storage device may select the status command from a corresponding submission queue, process it, and respond with verification status information to the corresponding completion queue. At data flow 293, the source storage device may select the status command from a corresponding submission queue, process it, and respond with verification status information to the corresponding completion queue.

At data flow 294, based on successful verification of both target storage devices, fused R/W data transfer command handler 106.2 may add a read command for the data transfer to the corresponding submission queue for the source storage device in NVMe I/O queue pairs 258. At data flow 295, the source storage device may select the read command from the corresponding submission queue and execute it based on the target data unit identifier and a buffer storage location in the command. At data flow 296, the source storage device may send the read data to a corresponding buffer storage location in initiator data pages 260. At data flow 297, based on successful verification of both target storage devices, fused R/W data transfer command handler 106.2 may add a write command for the data transfer to the corresponding submission queue for the destination storage device in NVMe I/O queue pairs 258. At data flow 298, the destination storage device may select the write command from the corresponding submission queue and execute it based on the target data unit identifier and the buffer storage location in the command. At data flow 299, the destination storage device may read the read data from the corresponding buffer storage location in initiator data pages 260 to write it to a corresponding storage location in namespace 276.1. Following completion of the data transfer, corresponding completion responses may be sent back through NVMe I/O queue pairs 258, network queue pairs 254, network queue pairs 224, and NVMe queue pairs 222.

Figure 3:
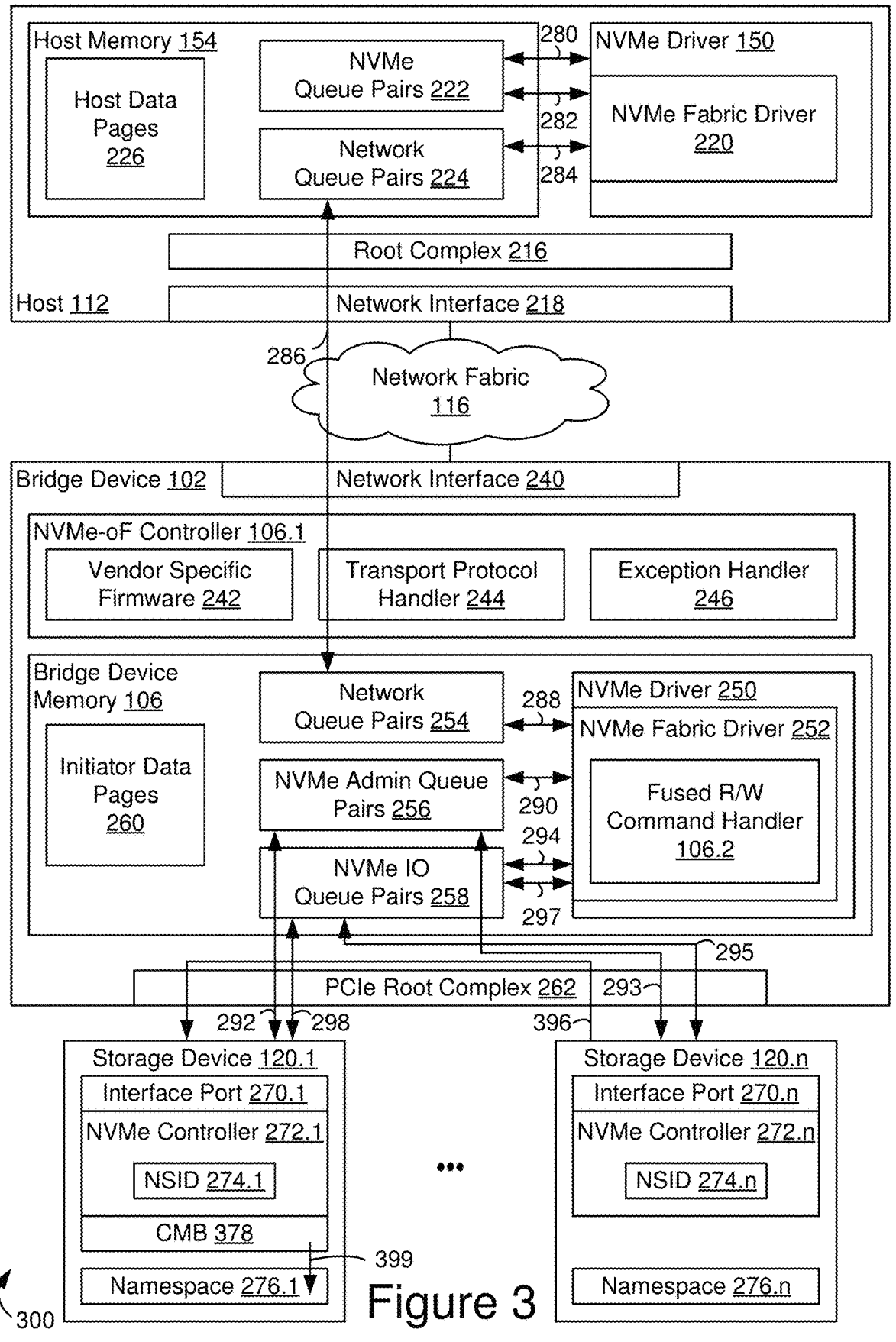
FIG. 3 schematically illustrates an alternative system architecture using the bridge device for data transfer where the data storage devices include controller memory buffers.
Figure 5:
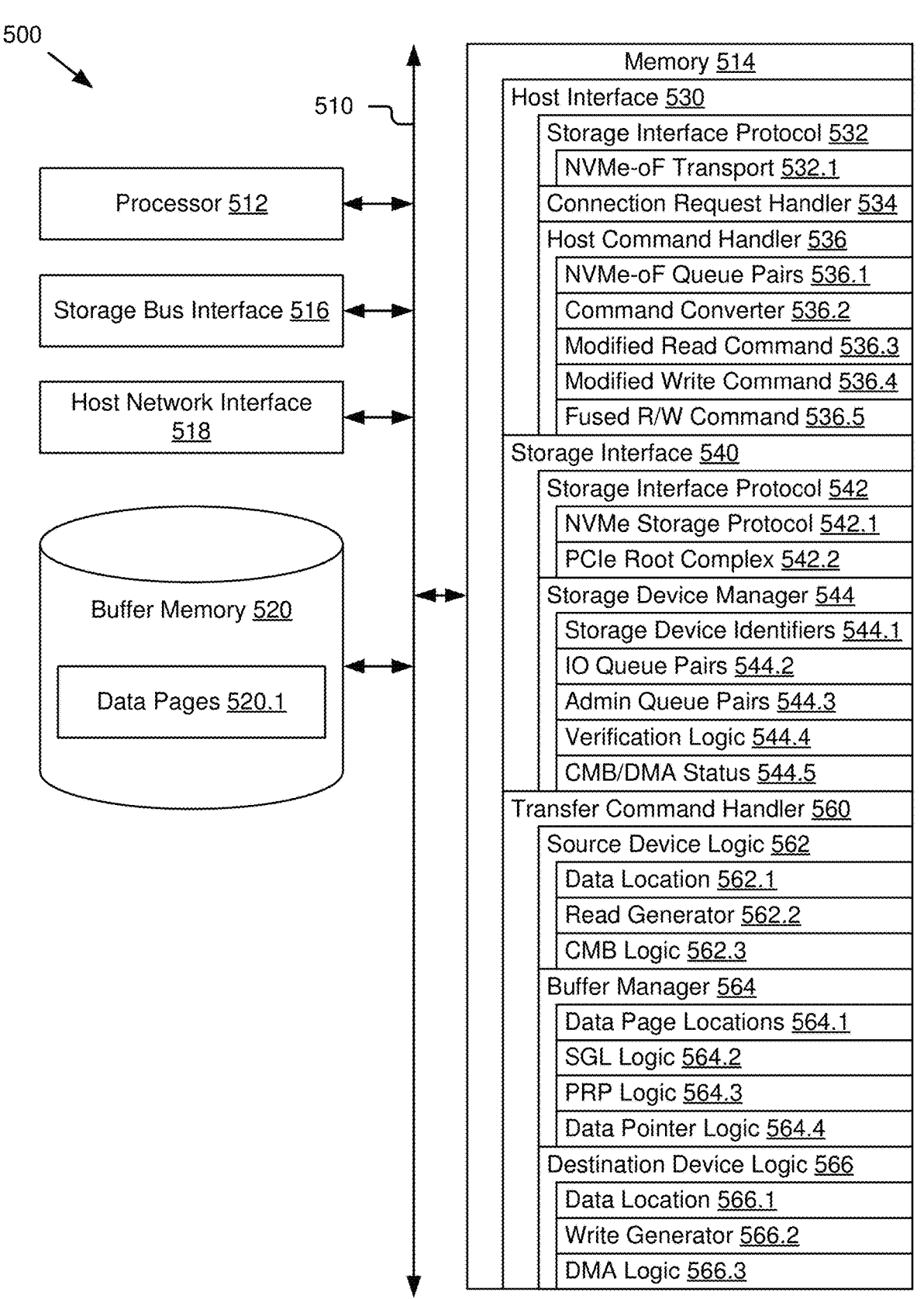
FIG. 5 schematically illustrates some elements of the bridge device of FIG. 1-3 in more detail.

In FIG. 3, a similar system architecture for storage system 300 is shown. It is configured and operates similarly to storage system 200 in FIG. 2. However, in storage system 300, storage devices 120.1-120.n may each include a controller memory buffer (CMB), such as CMB 378 in storage device 120.1. For example, NVMe storage devices may include a buffer memory configured for direct memory access by other devices in the system and enable a corresponding access and addressing scheme for memory locations in that buffer memory. In some configurations, storage system 300 may be configured to handle data transfer commands without using initiator data pages 260 in bridge device memory 106. The buffer memory locations for the data transfer may be in CMB 378 rather than bridge device memory 106 and utilize direct memory access between storage devices 120.

Fused R/W data transfer command handler 106.2 may be configured to generate read and write commands that utilize controller memory buffer 378 and provide corresponding parameters in the read and write commands generated from the data transfer command. In some configurations, verification data flows 290-293 may include verification of controller memory buffer configuration and/or status. Responsive to the verifications, the read command at data flow 294 may include parameters for buffering the read data to the controller memory buffer of the destination storage device. For example, the source storage device may execute the read command received at data flow 295 that includes a storage location in CMB 378 to receive the read data. At data flow 396, the target data unit may be read from namespace 276.n to CMB 378 using direct memory access through PCIe root complex 262. Fused R/W data transfer command handler 106.2 may then include the buffer storage location for the read data in CMB 378 in the write command at data flow

297. In response to the write command at data flow 298, the destination storage device may determine the buffer storage location for the target data unit in CMB 378. At data flow 399, the destination storage device may write the data unit from CMB 378 to the target storage location in namespace 276.1.

FIG. 4 illustrates a flowchart of method 400, which outlines a series of steps for handling a fused read-write command for data transfer using a bridge device, such as the bridge devices of FIGS. 1-3. The method is executed by components within the storage system, such as a bridge device between a host system and an array of data storage devices connected to the bridge device, which are configured to process and convert data transfer commands. The method culminates in the successful reading of data from a source storage device and writing that data to a destination storage device without transferring data to the host, effectively facilitating direct data transfers between storage devices while reducing traffic and memory use of the host. Overall, method 400 provides a systematic approach to managing fused read-write commands, enhancing the efficiency of data movement between storage devices.

At block 410, the firmware for handling fused read-write commands is configured. For example, the storage system may update its firmware to include the vendor specific logic for processing fused commands that combine read and write operations.

At block 412, a fused read-write command is received from the host. For example, the bridge device within the storage system may receive a command that requests the transfer of data from one namespace to another among storage devices within the same storage system.

At block 414, the received command is decoded to extract the relevant parameters for the data transfer. For example, the storage controller may parse the command to determine the source and destination namespaces as well as the specific data units to be transferred.

At block 416, transfer parameters are determined based on the decoded command. For example, the system may determine the logical block address for the target data unit and the namespace identifiers, host connections, and storage device identifiers for the source and destination namespaces.

At block 418, connections to the target drives are verified to ensure that the data can be transferred successfully. For example, the system may check the availability and accessibility of the source and destination storage devices by querying those devices before proceeding with the data transfer.

At block 420, an error is returned and the command is aborted if no connection to one or both target drives is found. For example, the storage system may send an error message to the host and halt the transfer process if either the source or destination storage device is not reachable.

At block 422, a read command for the target namespace and data unit is generated based on the verified connections. For example, the system may create a command to retrieve the specified data from the source storage device.

At block 424, it is determined whether a controller memory buffer in the destination storage device is enabled for the data transfer. For example, the system may check if the destination storage device is configured to use an onboard memory buffer to temporarily hold the read data during the transfer and the source storage device is configured for direct memory access to buffer the read data to the controller memory buffer.

At block 426, if the controller memory buffer is not enabled, the initiator memory is prepared for receiving the read data. For example, the system may allocate space in a bridge device's memory to store the data read from the source storage device.

At block 428, a write command is generated for the destination namespace and data unit. For example, the system may create a command to write the retrieved data to the destination storage device.

At block 430, the read command is sent to the source storage device to initiate the data retrieval process. For example, the system may transmit the command to the source device, prompting it to read the specified data.

At block 432, data is read from the source storage device to the initiator memory. For example, the system may transfer the data from the source device's storage medium to the bridge device's allocated memory space.

At block 434, the write command is sent to the destination storage device to initiate the data writing process. For example, the system may transmit the command to the destination device, instructing it to store the data received from the source device.

At block 436, data is written from the initiator memory to the destination storage device. For example, the system may transfer the data from the bridge device's memory to the destination device's storage medium, completing the data transfer process.

At block 438, direct memory access parameters are determined if the controller memory buffer is enabled. For example, the system may configure the direct memory access settings to facilitate the transfer of data directly between the storage devices' memory buffers.

At block 440, a write command is generated for the destination namespace and data unit, considering the direct memory access parameters. For example, the system may create a command that instructs the destination storage device to write the data from its controller memory buffer based on a buffer storage location determined for the read command.

At block 442, the read command is sent to the source storage device, which is configured to use the controller memory buffer of the destination storage device. For example, the system may transmit the read command to the source storage device with a read buffer pointer for a storage location in the CMB of the destination storage device.

At block 444, data is read to the controller memory buffer in the destination storage device. For example, the system may directly copy the data from the source device's storage medium to the destination storage device's CMB using direct memory access.

At block 446, the write command is sent to the destination storage device. For example, the system may send the write command including the write buffer pointer to the storage location in the destination storage device's CMB, where it was written at block 444.

At block 448, data is written from the destination storage device's controller memory buffer to its non-volatile storage medium. For example, the destination storage device may readily transfer the data unit from its CMB to its storage medium, bypassing the initiator memory.

Bridge device 500 may include a bus 510 interconnecting at least one processor 512, at least one memory 514, at least one storage bus interface 516, and at least one host network interface 518. Bus 510 may include one or more conductors that permit communication among the components of bridge device 500. Processor 512 may include any type of processor or microprocessor that interprets and executes instructions or operations. In some configurations, multiple processors or processor cores and/or multiple interface or controller circuits may operate alone or in cooperation to provide the functions described below. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include one or more physical interfaces for connecting to one or more data storage devices using an interface protocol that supports storage device access. For example, storage bus interface 516 may include a PCIe or similar storage interface connector supporting NVMe access to solid state media in a set of connected data storage devices. In some configurations, storage bus interface 516 may include and support a plurality of physical ports corresponding to physically and logically distinct backend connection paths through one or more switches, such as a PCIe switch.

Host network interface 518 may include one or more physical interfaces for connecting to one or more host nodes, generally via a fabric network, such a network interface supporting ethernet and/or internet protocols. For example, host network interface 518 may include an ethernet connection through a network interface card, or similar network interface connector, to a host system or network switches and/or routers for directing network communication among multiple systems. In some configurations, interface connectors supporting NVMe-oF host connection protocols, such as RDMA and transfer control protocol/internet protocol (TCP/IP) connections, may be used.

Bridge device 500 may include a plurality of modules or subsystems that are stored and/or instantiated in memory 514 for execution by processor 512 as instructions or operations. In some configurations, some functions shown in memory 514 may be implemented in hardware circuits that support software or firmware operations using processor 512 and memory 514. For example, memory 514 may include a host interface 530 configured to receive, process, and respond to host connection and storage commands from client or host systems. In some configurations, host interface 530 may be configured as or include functions of an NVMe-oF target device. Memory 514 may include a storage interface 540 configured to manage converting and forwarding storage commands to backend data storage devices connected to the bridge device. In some configurations, storage interface 530 may be configured as or include functions of an NVMe initiator device. Memory 514 may include a transfer command handler 560 configured provide the logic for handling data transfer commands, such as fused R/W data transfer commands, from the host system. In some configurations, transfer command handler 560 may be configured as or include functions of vendor-unique firmware implemented on top of an existing storage protocol, such as NVMe-oF and NVMe.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more namespaces in the storage devices for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through host network interface 518 to host data units stored in the data storage devices. For example, host interface 530 may include host communication protocols compatible with ethernet, PCIe, and/or another host interface that supports use of NVMe and/or RDMA protocols for data access to host data. In some configurations, one or more functions of host interface 530 may be instantiated in or interact with transfer command handler 560.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over host network interface 518. For example, host interface 530 may include a connection request handler 534 configured to receive and respond to host connection requests. For example, host interface 530 may include a host command handler 536 configured to receive host storage commands to a particular host connection. In some embodiments, host interface 530 may include additional modules (not shown) for command handling, buffer management, storage device administration and reporting, and other host-side functions.

In some embodiments, storage interface protocol 532 may include NVMe-oF compliant communication, command, and syntax functions, procedures, and data structures. In some embodiments, storage interface protocol 532 may include an NVMeoF or similar protocol supporting RDMA, TCP/IP, and/or other connections for communication between host nodes and target host data in the data storage devices, such as volumes or namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while host command handler 536 may convert the commands received using a network storage protocol from the host to corresponding commands complying with a storage bus protocol for management through storage interface 540.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. Once a host connection for a frontend queue pair is established, connection request handler 534 may interact with storage interface 540 to add the host queue pair to the queue pair identifiers and queue pair mapping for backend path management.

Host command handler 536 may include interfaces, functions, parameters, and/or data structures to handle storage requests directed to the host storage connections allocated through connection request handler 534. For example, once a host storage connection for a given namespace and host connection identifier is allocated to a backend connection path, the host may send any number of storage commands targeting data stored in that namespace. In some configurations, host command handler 536 may be instantiated in or interface with NVMe-oF controller or driver that manages NVMe-oF queue pairs assigned to the host connections. For example, the NVMe-oF controller may provide submission queue and completion queue doorbells for receiving host storage commands and completion responses. Host command handler 536 may respond to submission queue doorbells to receive and process incoming host storage commands. In some configurations, the host storage protocol may be different than the storage device protocol. For example, host storage commands may be encapsulated for transport according to NVMe-oF and fabric network protocols. Host command handler 536 may include command converter 536.2 for de-capsulating the received commands to convert them to syntax compatible with storage interface 540. For example, command converter 536.2 may receive NVMe-oF commands sent to the bridge device as a target and reformat them as NVMe commands from the bridge device as initiator to the storage devices as targets.

In some configurations, host command handler 536 may provide an interface to and/or include or interact with transfer command handler 560. For example, host command handler 536 may be configured for managing vendor-unique data transfer commands for moving host data units between namespaces in different storage devices. In some configurations, host command handler 536 may be configured to receive and parse modified read commands 536.3 that instruct bridge device 500 to read host data into a buffer location in buffer memory 520 or a controller memory buffer in the data storage devices, rather than transferring it back to the host. For example, a read buffer location parameter (e.g., memory location pointer) in the read command may be replaced by a parameter value that indicates to bridge device 500 that it is responsible for determining the read buffer memory location without involving the host. Host command handler 536 may be configured to receive and parse modified write commands 536.4 that instruct bridge device 500 to write host data from a buffer location in buffer memory 520 or a controller memory buffer in the data storage devices, rather than from a host memory buffer. For example, a write data location parameter (e.g., memory location pointer) in the write command may be replaced be a parameter value that indicates to the bridge device that it is responsible for determining the write data location without involving the host. In some configurations, modified read commands 536.3 and modified write commands 536.4 may be merged into a fused read/write data transfer command 536.5. For example, the parameters of the modified read command and modified write command may be fused into a single command for entry in the submission queue and may be an atomic operation with a single submission and completion from the perspective of the host system.

Storage interface 540 may include an interface protocol and/or set of functions and parameters for passing host storage commands for reading, writing, and deleting data units in corresponding backend storage devices to those storage devices. Storage interface 540 may also support host administrative commands through backend queue pairs. Storage interface 540 may support data transfer commands that use multiple administrative and/or storage commands to the storage devices to support a host data transfer without transferring data back to the host. In some embodiments, storage interface 540 may include a plurality of hardware and/or software modules configured to use processor 512 and memory 514 to handle or manage defined operations of storage interface 540. For example, storage interface 540 may include a storage interface protocol 542 configured to comply with the physical, transport, and storage application protocols supported by the storage devices for communication over storage bus interface 516. For example, storage interface 540 may include a storage device manager 544 configured to manage communications with the storage devices in compliance with storage interface protocol 542.

In some embodiments, storage interface protocol 542 may include PCIe and NVMe compliant communication, command, and syntax functions, procedures, and data structures. In some embodiments, storage interface protocol 542 may include an NVMe protocol supporting RDMA, TCP/IP, and/or other connections for communication between host nodes and target host data in the data storage devices, such as volumes or namespaces mapped to the particular host. Storage interface protocol 532 may include interface definitions for directing storage commands through a PCIe root complex 542.2 that is shared among the connected data storage devices, as well as for providing responses to those requests and commands. In some configurations, bridge device 500, one or more PCIe switches, and the connected storage devices may all share the PCIe root complex that interfaces with one or more processors 512 to support PCIe communication transactions among the various devices, include peer communication between storage devices. In some embodiments, storage interface protocol 532 may assure that storage interface 540 is compliant with initiator request, command, and response syntax for host storage commands forwarded by bridge device 500 to target storage devices.

Storage device manager 544 may include interfaces, functions, parameters, and/or data structures to manage how host storage commands are sent to corresponding processing queues in the storage devices and responses are returned for the hosts. In some embodiments, storage device manager 544 may manage a plurality of storage devices, such as an array of storage devices in a storage node. For example, storage device manager 544 may be configured for a storage array of eight SSDs, each SSD having a unique storage device identifier 544.1 and configuration. Storage device manager 544 may be configured to manage any number of storage devices. In some embodiments, storage device manager 544 may include a data structure containing storage device identifiers 544.1 and configuration information for each storage device, such as port and/or other addressing information, device type, capacity, number of supported queue-pairs, input/output (I/O) queue depth, controller memory buffer/direct memory access parameters, etc. Storage device manager 544 may support one or more queue pairs including I/O queue pairs 544.2 and administrative queue pairs 544.3 associated with each data storage device. For example, each data storage device may support one or more queue pairs dynamically mapped to one or more namespaces allocated within the non-volatile memory of that data storage device and supporting host I/O commands. In some configurations, one or more queue pairs for each storage device may be allocated to processing administrative commands, rather than host storage commands. For example, storage device manager 544 may support verification logic 544.4 for checking the connection status with one or more storage devices targeted by a storage command. Verification logic 544.4 may use status query commands to the administrative queues of the targeted storage devices (which generally have shorter queues than I/O queues) to quickly determine the connection status and whether the storage device is available for processing an I/O command. In some configurations, administrative queries and/or previously stored parameters related to storage device identifiers 544.1 may be used to determine whether target storage devices have controller memory buffers enabled and, if so, the direct memory access parameters for utilizing memory locations in those controller memory buffers.

Transfer command handler 560 may include interface protocols and a set of functions, parameters, and data structures for handling transfer commands received through host interface 530, converted into multiple storage commands, and sent through storage interface 540 for processing by the storage devices. For example, transfer command handler 560 may receive transfer commands, such as modified read and write comments (individually or from a fused command), that have been de-capsulated and use their parameters to generate corresponding read and write commands using NVMe and a read/write buffer selected by bridge device 500. In some configurations, transfer command handler 560 may include a plurality of hardware and/or software modules configured to use processor 512 and memory 514 to handle or manage defined operations of transfer command handler 560. For example, transfer command handler 560 may include source device logic 562 configured for handling the read side of the data transfer, buffer manager 564 configured for handling the selection and use of a buffer memory, and destination device logic 566 configured for handling the write side of the data transfer.

Buffer manager 564 may be configured to handle the determination of appropriate read/write buffer locations and the corresponding storage location parameters for read and write commands. Data page locations 564.1 may include hardware and/or software mechanisms for identifying and allocating memory spaces within the bridge device that can be used to temporarily store data during the transfer process. For example, this could involve a dynamic memory allocation system that assigns buffer space from buffer memory 520 based on current system usage and data transfer size. Scatter gather list logic 564.2 may be responsible for generating scatter gather lists (SGL) that map the data to be transferred to the allocated buffer memory locations. For example, if the source and destination namespaces are configured to use SGL data mapping, then the buffer memory selected by buffer manager 564 should also be configured to use SGL. Similarly, physical region page logic 564.3 may include algorithms or hardware mechanisms that translate logical buffer addresses into physical region page (PRP) addresses to ease the transfer and mapping of read and write data through the buffer memory. Data pointer logic 564.4 may be tasked with updating the data pointers in the read and write commands to reflect the determined buffer locations. In some configurations, the modified read and write commands from the host may not include read/write buffer locations (or include parameters that tell transfer command handler 560 to ignore those locations) and data pointer logic 564.4 may provide a mechanism for replacing or updating those missing parameters for the determined buffer location.

Destination device logic 566 may be configured to manage the write operations for data transfer processes. Destination device logic 566 may determine a data location 566.1 in the destination storage device to store the data unit being transferred. For example, data location 566.1 may include the namespace, storage device, and logical block address for the target data unit as determined from the modified write command. Write generator 566.2 may be responsible for creating the actual write command that will be sent to the destination storage device. Write generator 566.2 may utilize software routines to format the command parameters, including data location 566.1, according to NVMe protocol specifications. Direct memory access logic 566.3 may include logic to facilitate the efficient transfer of data from the buffer memory directly to the storage device, potentially using DMA operations to access the controller memory buffer of the source storage device such that the data is only transported through the PCIe interface once. For example, data pointer logic 564.4 may provide a pointer to a memory location in the CMB of the source storage device and the destination storage device may use RDMA protocols over PCIe to directly access the memory location for writing the data unit to the non-volatile storage medium of the destination storage device.

FIG. 6 presents a flowchart of method 600, which delineates an example sequence of operations for managing data transfer commands by a bridge device within a storage system. The method may be executed by the bridge device's firmware and interface hardware for the NVMe-oF target and NVMe initiator functions of the bridge device. The outcome of the method is the successful management and execution of data transfer commands, resulting in the transfer of data between storage devices without the data traversing back to the host system.

At block 610, connections with data storage devices are managed. For example, the bridge device may establish and maintain communication channels with each connected storage device to ensure readiness for data transfer operations.

At block 612, connections with the host system are managed. For example, the bridge device may authenticate and authorize host systems, setting up secure communication pathways for the transmission of data transfer commands and connecting the host systems to specific namespaces and corresponding data transfer paths through a series of queue pairs.

At block 614, a data transfer command from the host system is received. For example, the bridge device may accept an incoming command from the host that specifies the source and destination of the intended data transfer. In some configurations, separate modified read and modified write commands are received to the submission queues and, in other configurations, a fused R/W data transfer command may be received.

At block 616, encapsulation of the data transfer command is removed. For example, the bridge device may decode the command received in a network storage protocol format to extract the underlying data transfer instructions for transmission in a bus storage protocol.

At block 618, the source data storage device is determined. For example, the bridge device may identify the storage device from which data is to be read based on the information provided in the data transfer command.

At block 620, the destination data storage device is determined. For example, the bridge device may ascertain the storage device to which data is to be written, as specified in the data transfer command.

At block 622, the read data buffer location is determined. For example, the bridge device may allocate a portion of its memory to temporarily hold the data read from the source storage device or may use a controller memory buffer or other buffer memory provided by one or both storage devices in the transfer.

At block 624, the data transfer command is converted into a read command. For example, the bridge device may generate an NVMe-compliant read command targeting the source storage device, based on the parameters extracted from the data transfer command and a data pointer for the buffer location.

At block 626, the data transfer command is converted into a write command. For example, the bridge device may generate an NVMe-compliant write command directed at the destination storage device, utilizing the parameters derived from the data transfer command and the data pointer for the buffer location.

At block 628, the read command is sent to the source data storage device. For example, the bridge device may dispatch the read command to the identified source storage device to initiate the retrieval of the specified data.

At block 630, the write command is sent to the destination data storage device. For example, the bridge device may transmit the write command to the identified destination storage device to commence the writing of the data that was read from the source.

At block 632, a response to the host system is returned. For example, the bridge device may send a confirmation or status update back to the host system to signal the completion or progress of the data transfer command execution.

Figure 7:
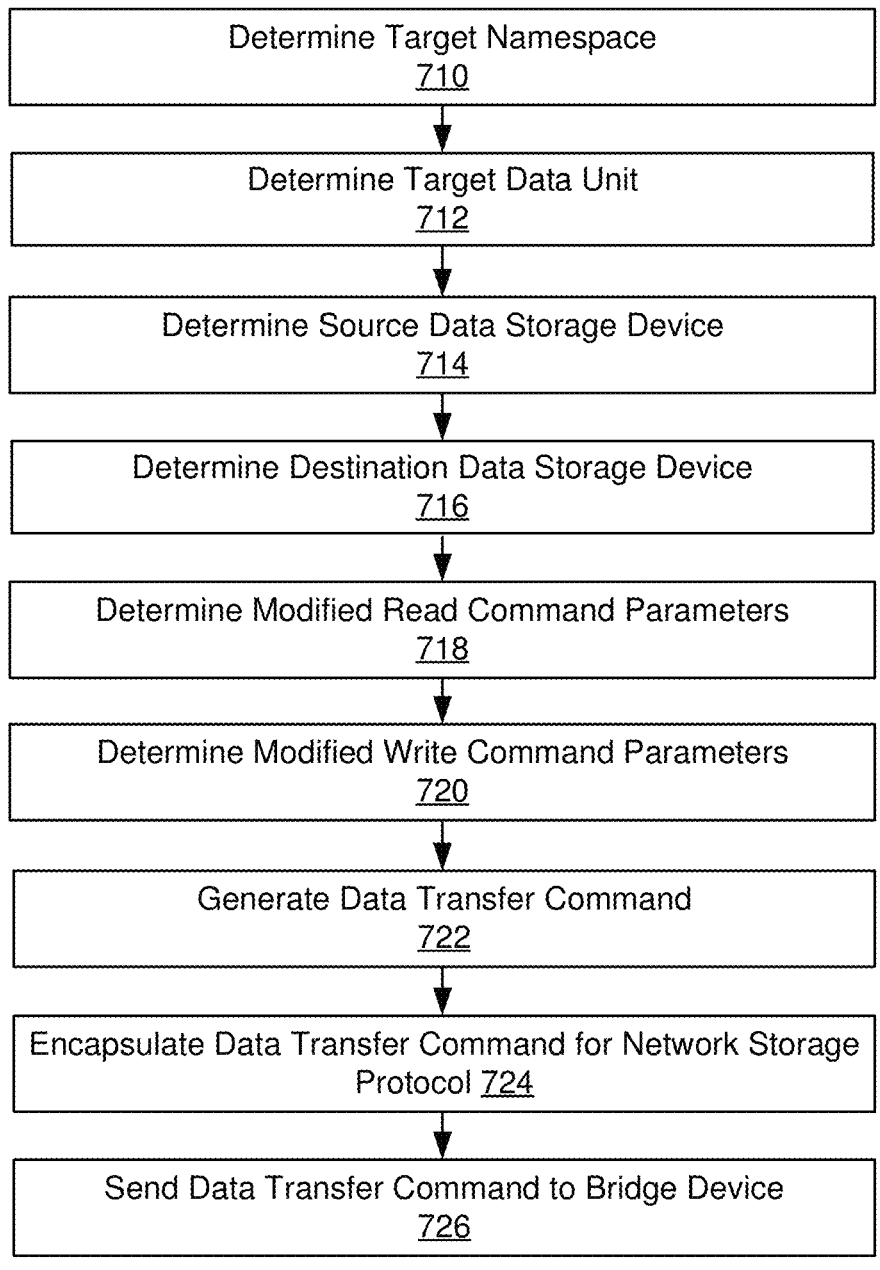
FIG. 7 is a flowchart of an example method of generating and sending data transfer commands from a host.

FIG. 7 illustrates a flowchart of method 700, which provides an example approach for generating and sending a data transfer command from a host within a storage system. The method is typically executed by the host system's NVMe driver or a similar component that interfaces with the storage system and includes firmware supporting vendor-unique data transfer commands. The outcome of the method is the creation and transmission of a data transfer command that facilitates the movement of data between namespaces within the storage system without returning the transferred data to the host system.

At block 710, the target namespace for the data transfer is determined. For example, the host system's NVMe driver may identify the namespace within the storage system where the data is to be transferred.

At block 712, the target data unit within the namespace is determined. For example, the system may specify the logical block address range that the data transfer will affect.

At block 714, the source data storage device from which data will be read is identified. For example, the NVMe driver may select the appropriate storage device based on the source namespace provided in the data transfer request.

At block 716, the destination data storage device to which data will be written is identified. For example, the system may determine the destination storage device that corresponds to the target namespace.

At block 718, the parameters for the modified read command are determined. For example, the NVMe driver may establish the parameters that dictate how data will be read from the source storage device, excluding the data pointer information.

At block 720, the parameters for the modified write command are determined. For example, the system may set the parameters that will govern the writing of data to the destination storage device, including the target namespace and data unit information, but excluding the data pointer information for the write data.

At block 722, the fused data transfer command, combining the modified read and write commands, is generated. For example, the NVMe driver may fuse the previously determined parameters into a single atomic command.

At block 724, the fused data transfer command is encapsulated for the network storage protocol. For example, the system may wrap the command in a format suitable for transmission over the network fabric using NVMe-oF.

At block 726, the encapsulated data transfer command is sent to the bridge device. For example, the host system may transmit the command through the network fabric to a corresponding submission queue in the bridge device for the host connection to the namespace.

FIG. 8 outlines a flowchart of method 800, which is an example procedure for verifying data connections to support data transfer commands within a storage system. The method is executed by components such as the bridge device's firmware, which is equipped to process such commands and includes corresponding verification logic.

At block 810, a data transfer command is received. For example, the bridge device's firmware may accept a command from the host system that initiates the data transfer process between storage devices.

At block 812, the connection to the source data storage device is verified. For example, the bridge device may check the availability and accessibility of the source storage device before proceeding with the data transfer.

At block 814, the connection to the destination data storage device is verified. For example, the bridge device may confirm that the destination storage device is ready to receive the data to be transferred.

At block 816, it is determined whether both connections are verified. For example, the bridge device may proceed with the data transfer if both the source and destination storage devices are confirmed to be connected and accessible.

At block 818, the data transfer command is converted. For example, the bridge device may parse the command and generate separate read and write commands for the source and destination storage devices, respectively, with the bridge device as the initiator.

At block 820, if the connections are not verified. For example, the bridge device may determine that either the source storage device or the destination storage device is unavailable.

At block 822, an error message is returned to the host system. For example, the bridge device may provide detailed information about the error to the host system for troubleshooting and resolution.

At block 824, the data transfer command is aborted. For example, the bridge device may terminate the command execution process if it cannot establish the requisite connections to the storage devices and not convert or generate the corresponding read and write commands.

FIG. 9 illustrates a flowchart of method 900, which is an example sequence of operations for managing buffer locations during data transfer commands within a storage system. The method is executed by the bridge device's firmware for handling data transfers.

At block 910, the namespace type is determined. For example, the bridge device may analyze the data transfer command to ascertain whether the data is to be transferred within an SGL or PRP formatted namespace.

At block 912, the scatter gather list is determined. For example, if the namespace is an SGL type namespace, the bridge device may generate a scatter gather list that maps the data to be transferred to buffer memory with similar mapping to the source and destination namespace.

At block 914, the physical resource page is determined. For example, if the namespace is a PRP type namespace, the bridge device may translate the logical addresses provided in the data transfer command into physical region page addresses within the buffer memory.

At block 916, it is determined whether a controller memory buffer is available. For example, the bridge device may check the status of the controller memory buffer in the source or destination storage device to decide if it can be used for the data transfer.

At block 918, the bridge buffer memory location is identified. For example, if the controller memory buffer is not available or suitable, the bridge device may allocate a portion of its own memory to temporarily store the data during the transfer.

At block 920, the controller memory buffer location is identified. For example, if the controller memory buffer of at least one of the storage devices is available, the bridge device may use it as the temporary storage location for the data during the transfer.

At block 922, the pointer in the write command for the buffer location is updated. For example, the bridge device may modify the write command to include the determined buffer memory location, ensuring that the data is written from the correct place.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:

a storage interface configured to communicate with a plurality of data storage devices;

a host interface configured to communicate with at least one host system; and a bridge device comprising at least one controller configured to, alone or in combination:

provide, through the host interface, a target device for a network storage protocol configured to receive encapsulated storage commands from the at least one host system;

establish, through the storage interface, communication with the plurality of data storage devices using a bus storage protocol, wherein the bridge device is configured as an initiator device for the plurality of data storage devices as target devices;

receive, from the at least one host system, a data transfer command identifying a target data unit, a source data storage device, and a destination data storage device, wherein:

the plurality of data storage devices includes the source data storage device and the destination data storage device; and the data transfer command comprises a fused command that includes a first set of parameters for a modified read command for the source data storage device and a second set of parameters for a modified write command for the destination data storage device; and convert the data transfer command into:

a read command to the source data storage device for the target data unit, wherein the source data storage device is configured to, responsive to the read command:

read the target data unit from a non-volatile storage medium of the source data storage device; and return the target data unit to a buffer location for the target data unit; and a write command to the destination data storage device for the target data unit, wherein:

converting the data transfer command comprises determining:

additional parameters added to the first set of parameters for the read command to the source data storage device; and additional parameters added to the second set of parameters for the write command to the destination data storage device;

the source data storage device is configured to, responsive to the read command:

read the target data unit from a non-volatile storage medium of the source data storage device; and return the target data unit to a buffer location for the target data unit; and the destination data storage device is configured to, responsive to the write command:

read the target data unit for the write command from the buffer location; and write the target data unit to a non-volatile storage medium of the destination data storage device.

2. The system of claim 1, wherein the at least one controller is further configured to, alone or in combination:

manage storage interface connections with the plurality of data storage devices using a shared interface root complex;

verify, responsive to receiving the data transfer command:

a first connection to the source data storage device; and a second connection to the destination data storage device; and send, responsive to verification being unsuccessful, an error message to the at least one host system.

3. The system of claim 1, wherein:

the data transfer command is received from the at least one host system using the network storage protocol to encapsulate the data transfer command;

converting the data transfer command further comprises removing encapsulation of the data transfer command prior to generating the read command and the write command; and the at least one controller is further configured to, alone or in combination and using the bus storage protocol:

send the read command to the source data storage device; and send the write command to the destination data storage device.

4. The system of claim 1, wherein:

converting the data transfer command further comprises:

generating the read command for the target data unit indicating the buffer location for read data; and generating the write command for the target data unit indicating the buffer location for the read data;

the buffer location is selected from:

a bridge device memory; or a controller memory buffer of the destination data storage device;

the buffer location is not in the at least one host system;

the buffer location is not indicated in the data transfer command; and the at least one controller is further configured to, alone or in combination:

determine the buffer location for the data transfer command;

send the read command to the source data storage device; and send the write command to the destination data storage device.

5. The system of claim 4, wherein determining the buffer location comprises at least one of:

determining at least one scatter gather list for the buffer location; and determining at least one physical region page for the buffer location.

6. The system of claim 4, wherein:

receiving the data transfer command uses a first set of command queues in the bridge device configured for host commands; and sending the read command and the write command uses a second set of command queues in the bridge device configured for data storage device commands.

7. The system of claim 1, wherein the destination data storage device:

comprises a controller memory buffer configured to include the buffer location; and provides, for the source data storage device, direct memory access to the controller memory buffer through a shared interface root complex.

8. The system of claim 7, wherein the target data unit is not stored in a bridge device memory between reading the target data unit from the source data storage device and writing the target data unit to the non-volatile storage medium of the destination data storage device.

9. The system of claim 1, further comprising:

a switch configured to provide a bus connection between the bridge device and the plurality of data storage devices; and the plurality of data storage devices, wherein each data storage device of the plurality of data storage devices comprises:

a non-volatile storage medium configured to store host data units;

a device storage interface configured for communication with the bridge device; and a device controller configured to receive storage commands using the bus storage protocol.

10. A computer-implemented method, comprising:

providing, by a bridge device and through a host interface, a target device for a network storage protocol configured to receive encapsulated storage commands from at least one host system;

establishing, by the bridge device and through a storage interface, communication with a plurality of data storage devices using a bus storage protocol, wherein the bridge device is configured as an initiator device for the plurality of data storage devices as target devices;

receiving, by the bridge device and from the at least one host system, a data transfer command identifying a target data unit, a source data storage device, and a destination data storage device, wherein:

the plurality of data storage devices includes the source data storage device and the destination data storage device; and the data transfer command comprises a fused command that includes a first set of parameters for a modified read command for the source data storage device and a second set of parameters for a modified write command for the destination data storage device;

converting, by the bridge device, the data transfer command into:

a read command to the source data storage device for the target data unit; and a write command to the destination data storage device for the target data unit, wherein converting the data transfer command comprises determining:

additional parameters added to the first set of parameters for the read command to the source data storage device; and additional parameters added to the second set of parameters for the write command to the destination data storage device;

reading, by the source data storage device and responsive to the read command, the target data unit from a non-volatile storage medium of the source data storage device;

writing, by the source data storage device and responsive to reading the target data unit, the target data unit to a buffer location;

reading, by the destination data storage device and responsive to the write command, the target data unit from the buffer location; and writing, by the destination data storage device and responsive to reading the target data unit, the target data unit to a non-volatile storage medium of the destination data storage device.

11. The computer-implemented method of claim 10, further comprising:

managing, by the bridge device, storage interface connections with the plurality of data storage devices using a shared interface root complex;

verifying, by the bridge device and responsive to receiving the data transfer command:

a first connection to the source data storage device; and a second connection to the destination data storage device; and sending, by the bridge device and responsive to verification being unsuccessful, an error message to the at least one host system.

12. The computer-implemented method of claim 10, further comprising:

sending, by the bridge device, the write command to the destination data storage device using the bus storage protocol, wherein:

the data transfer command is received from the at least one host system using the network storage protocol to encapsulate the data transfer command; and converting the data transfer command further comprises removing encapsulation of the data transfer command prior to generating the write command.

13. The computer-implemented method of claim 11, further comprising:

determining, by the bridge device, the buffer location for the data transfer command, wherein:

the buffer location is selected from:

a bridge device memory; or a controller memory buffer of the destination data storage device;

the buffer location is not in the at least one host system;

the buffer location is not indicated in the data transfer command; and converting the data transfer command further comprises:

generating the read command for the target data unit indicating the buffer location for read data; and generating the write command for the target data unit indicating the buffer location for the read data;

sending, by the bridge device, the read command to the source data storage device; and sending, by the bridge device, the write command to the destination data storage device.

14. The computer-implemented method of claim 13, wherein determining the buffer location comprises at least one of:

determining at least one scatter gather list for the buffer location; and determining at least one physical region page for the buffer location.

15. The computer-implemented method of claim 13, wherein:

receiving the data transfer command uses a first set of command queues in the bridge device configured for host commands; and sending the read command and the write command uses a second set of command queues in the bridge device configured for data storage device commands.

16. The computer-implemented method of claim 10, further comprising:

providing, for the source data storage device, direct memory access to the buffer location in a controller memory buffer in the destination data storage device through a shared interface root complex.

17. The computer-implemented method of claim 10, wherein the target data unit is not stored in a bridge device memory between reading the target data unit from the source data storage device and writing the target data unit to the non-volatile storage medium of the destination data storage device.

18. A bridge device comprising:

a storage interface configured to communicate with a plurality of data storage devices;

a host interface configured to communicate with at least one host system;

means for providing, through the host interface, a target device for a network storage protocol configured to receive encapsulated storage commands from the at least one host system;

means for establishing, through the storage interface, communication with the plurality of data storage devices using a bus storage protocol, wherein the bridge device is configured as an initiator device for the plurality of data storage devices as target devices;

means for receiving, from the at least one host system, a data transfer command identifying a target data unit, a source data storage device, and a destination data storage device, wherein:

the plurality of data storage devices includes the source data storage device and the destination data storage device; and the data transfer command comprises a fused command that includes a first set of parameters for a modified read command for the source data storage device and a second set of parameters for a modified write command for the destination data storage device; and means for converting the data transfer command into:

a read command to the source data storage device for the target data unit, wherein the source data storage device is configured to, responsive to the read command:

read the target data unit from a non-volatile storage medium of the source data storage device; and return the target data unit to a buffer location for the target data unit; and a write command to the destination data storage device for the target data unit, wherein:

converting the data transfer command comprises determining:

additional parameters added to the first set of parameters for the read command to the source data storage device; and additional parameters added to the second set of parameters for the write command to the destination data storage device;

the source data storage device is configured to, responsive to the read command:

read the target data unit from a non-volatile storage medium of the source data storage device; and return the target data unit to a buffer location for the target data unit; and the destination data storage device is configured to, responsive to the write command:

read the target data unit for the write command from the buffer location; and write the target data unit to a non-volatile storage medium
of the destination data storage device.

\* \* \* \* \*